T. W. CONNINGTON.
GLASS FURNACE.
APPLICATION FILED JAN. 31, 1911.

1,172,674.

Patented Feb. 22, 1916.
6 SHEETS—SHEET 1.

WITNESSES
R A Balderson
W Furnariss

INVENTOR
Thos. W. Connington,
by Bakewell, Byrnes & Parmelee
his Attys

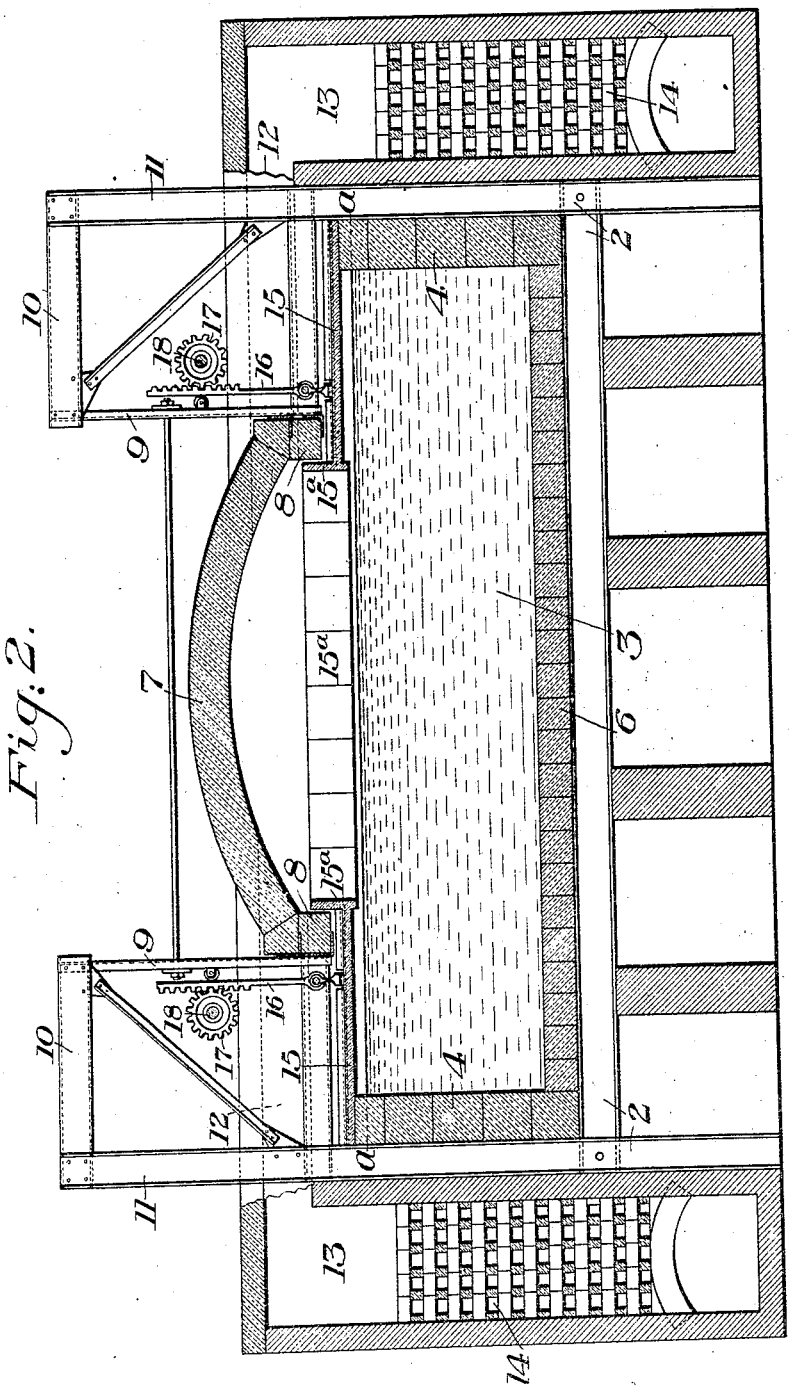

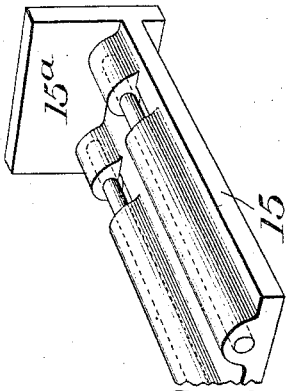
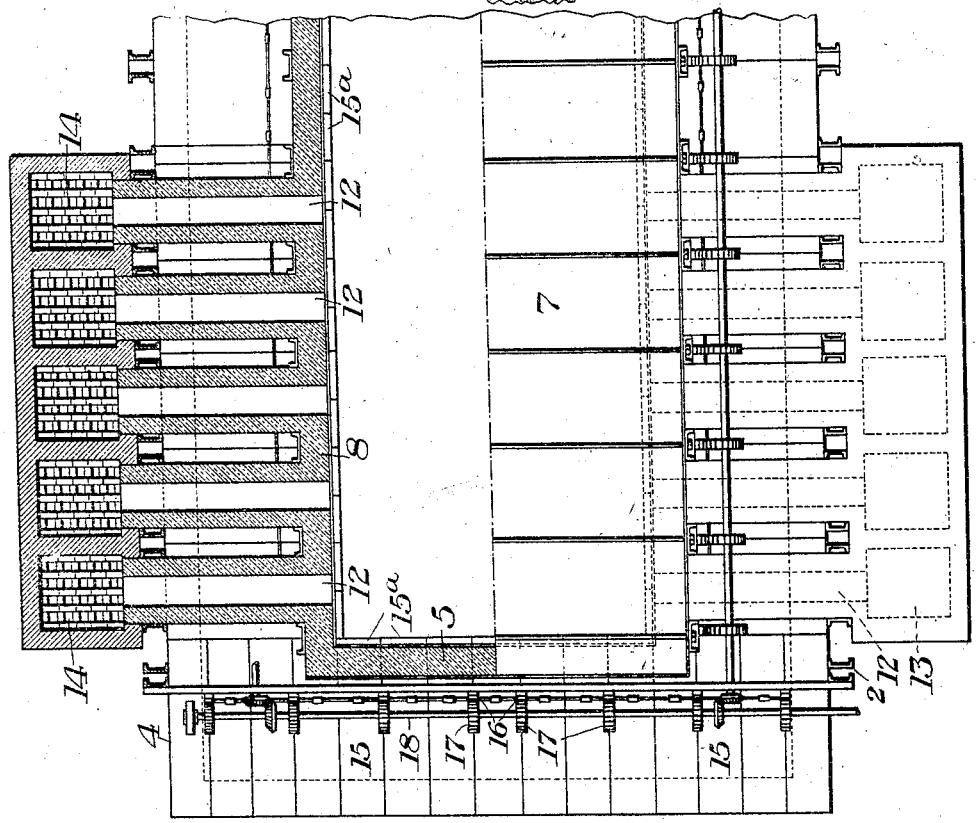

T. W. CONNINGTON.
GLASS FURNACE.
APPLICATION FILED JAN. 31, 1911.

1,172,674.

Patented Feb. 22, 1916.
6 SHEETS—SHEET 4.

WITNESSES
R. A. Balderson
W. Famaris

INVENTOR
Thos. W. Connington
by Bakewell, Byrnes & Parmelee.
his Attys.

T. W. CONNINGTON.
GLASS FURNACE.
APPLICATION FILED JAN. 31, 1911.

1,172,674.

Patented Feb. 22, 1916.
6 SHEETS—SHEET 5.

WITNESSES
R A Balderson
W Tamarise

INVENTOR
Thos. W. Connington,
by Bakewell, Byrnes & Parmelee
his Attys.

T. W. CONNINGTON.
GLASS FURNACE.
APPLICATION FILED JAN. 31, 1911.
1,172,674.
Patented Feb. 22, 1916.
6 SHEETS—SHEET 6.
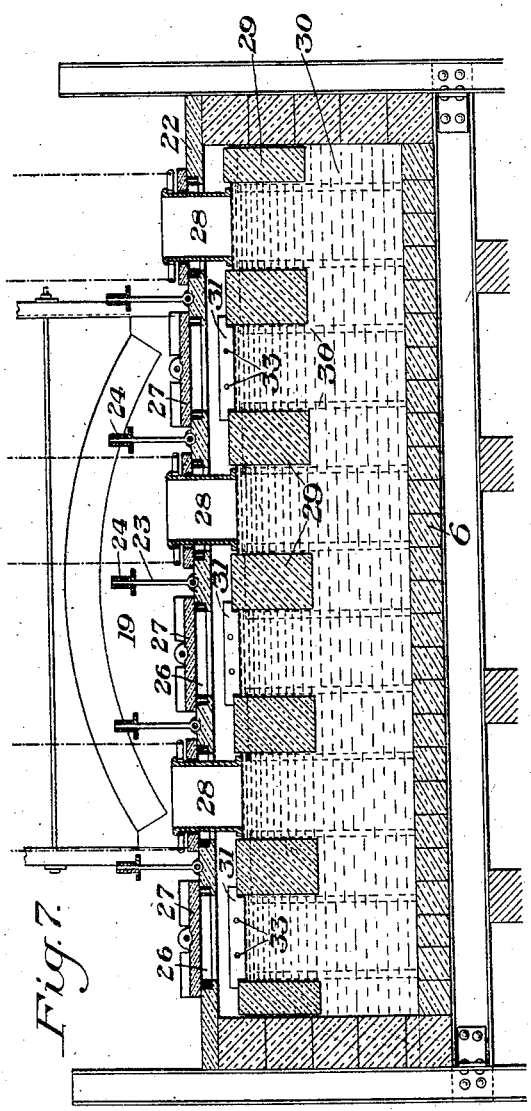
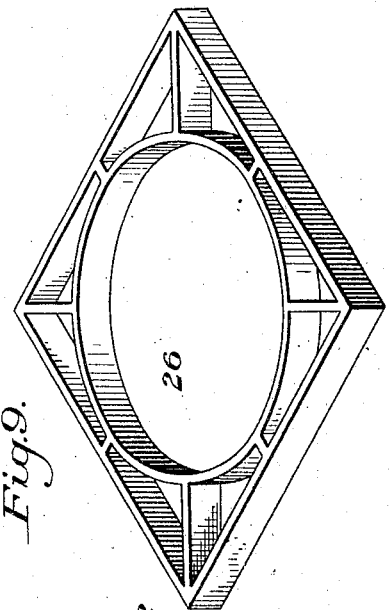
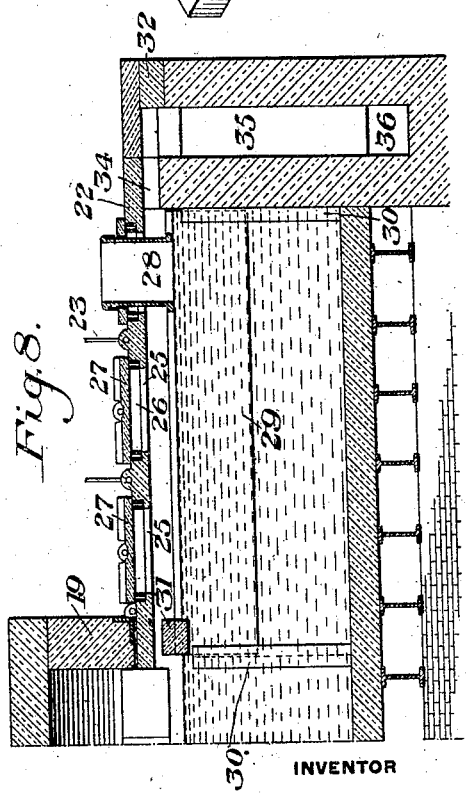
WITNESSES
R. A. Balderson
W. Farnariss
INVENTOR
Thos. W. Connington,
by Bakewell, Byrnes & Parmelee
his Attys.

UNITED STATES PATENT OFFICE.

THOMAS W. CONNINGTON, OF CLARKSBURG, WEST VIRGINIA.

GLASS-FURNACE.

1,172,674.

Specification of Letters Patent.   Patented Feb. 22, 1916.

Application filed January 31, 1911.   Serial No. 605,831.

*To all whom it may concern:*

Be it known that I, THOMAS W. CONNINGTON, resident of Clarksburg, Harrison county, West Virginia, have invented a new and useful Improvement in Glass-Furnaces, of which the following is a full, clear, and exact description, reference being had to the accompanying drawings, forming part of this specification, in which—

Figure 1:
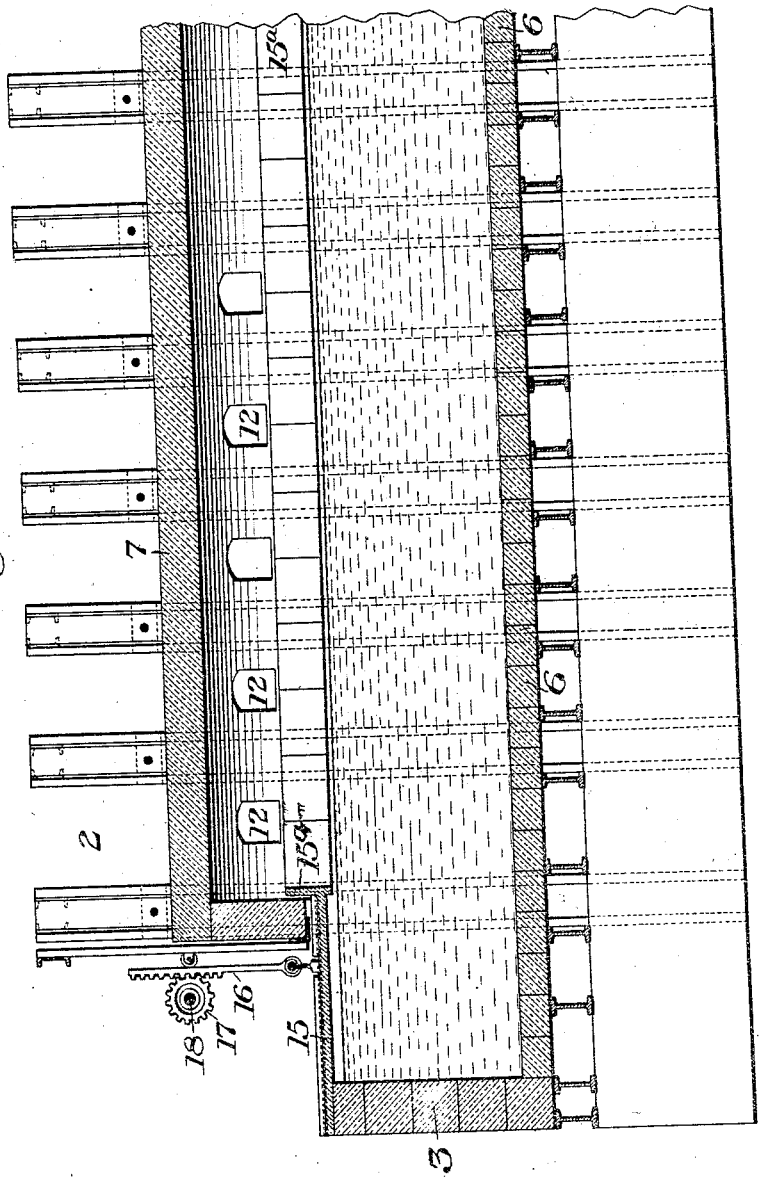
Figure 5:
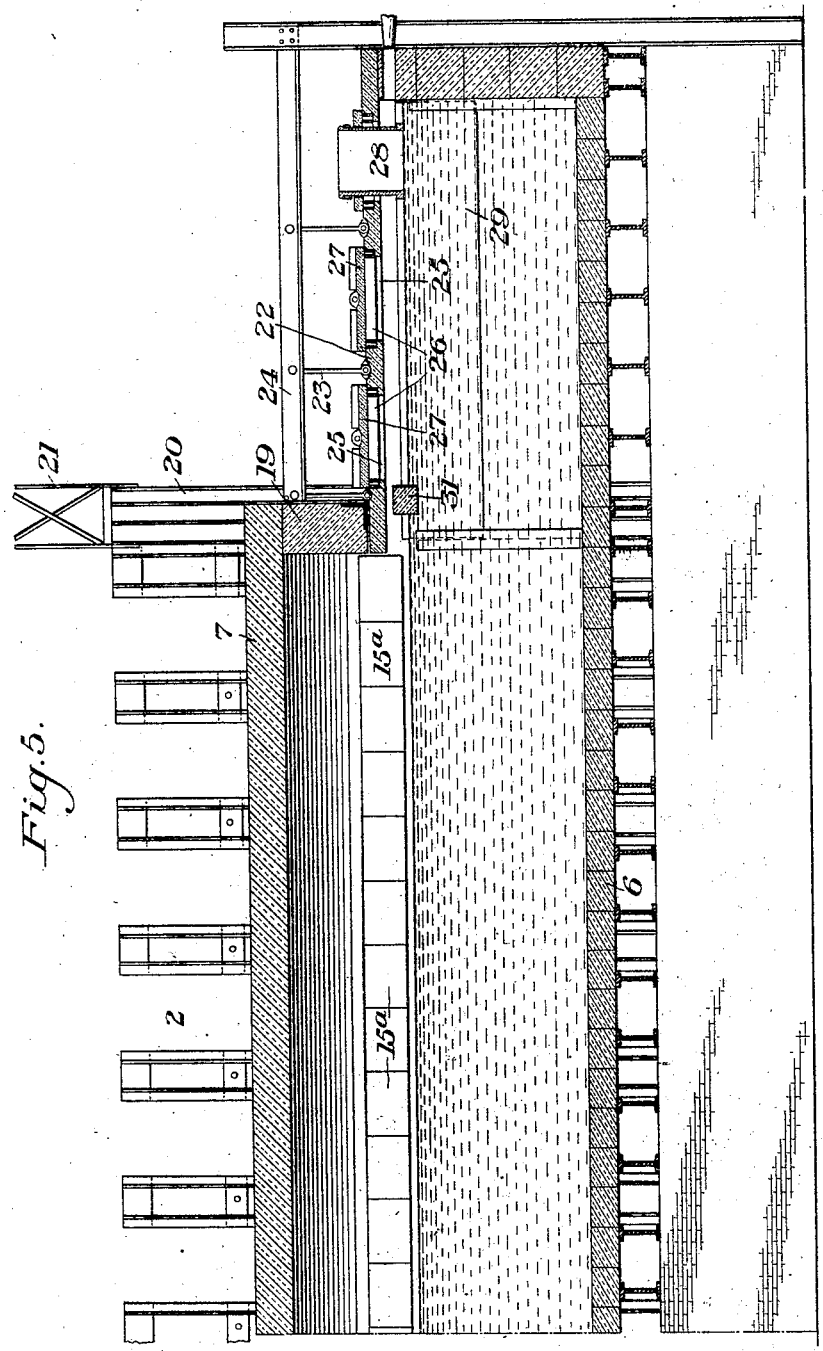
Figure 6:
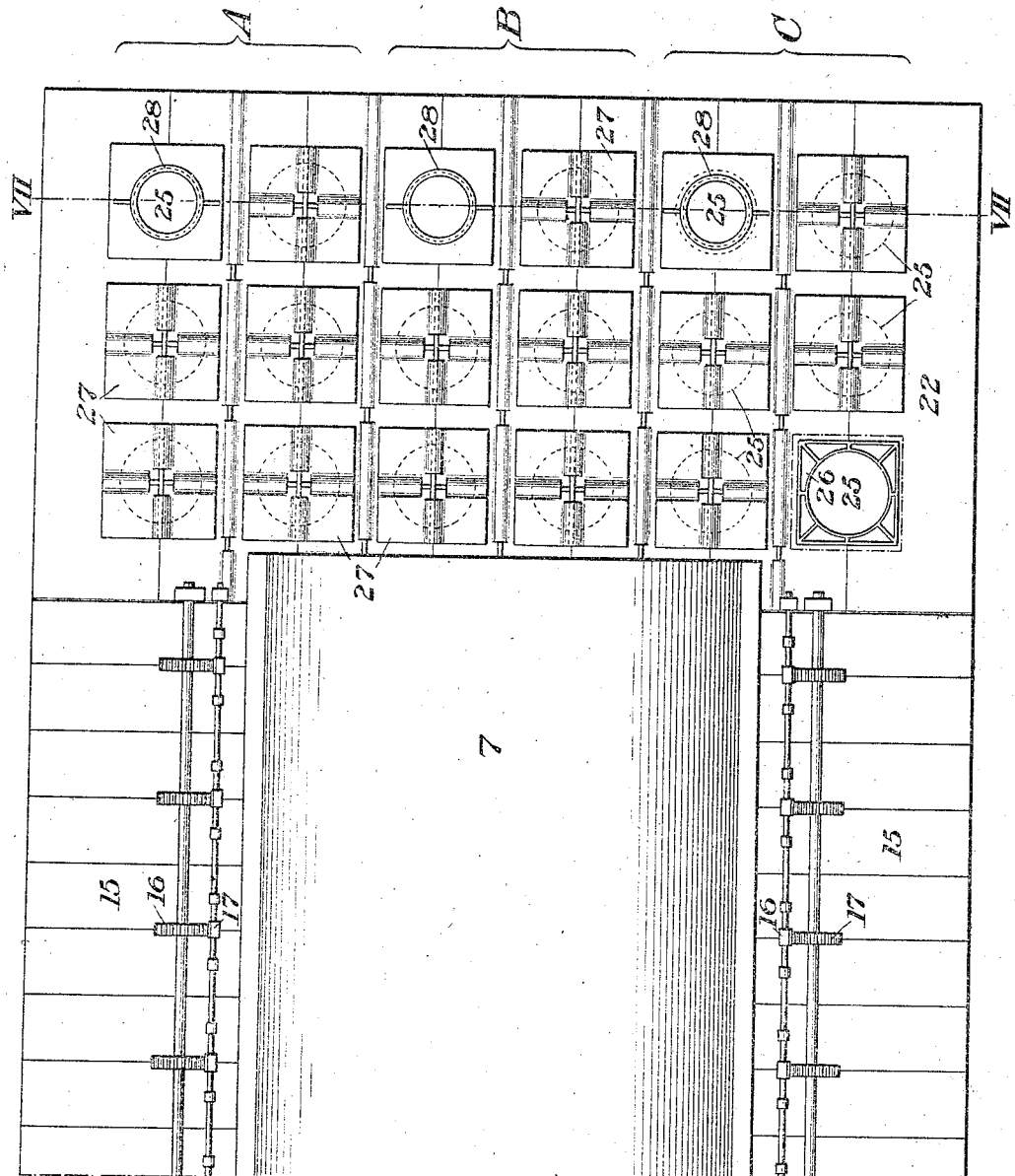

Figure 1 is a longitudinal vertical section of one end portion of a furnace embodying my invention; Fig. 2 is a transverse vertical section; Fig. 3 is a view partly in plan and partly in horizontal section of the portion of the furnace shown in Fig. 1; Fig. 4 is a perspective view of one of the cover or shield members; Fig. 5 is a longitudinal vertical section through the drawing end portion of the furnace, showing the preferred form; Fig. 6 is a plan view showing the preferred arrangement at the drawing end of the furnace, with the supporting frame and parts removed; Fig. 7 is a cross-section on the line VII—VII of Fig. 6; Fig. 8 is a longitudinal vertical section through the draw-end portion of the furnace, illustrating a modification; and Fig. 9 is a detail perspective view of one of the refractory rings which surround the drawing holes or openings.

My invention has relation to glass furnaces, and is designed to provide a furnace so constructed and arranged as to protect, in a large measure, the refractory wall or lining of the furnace chamber from the destructive action of the heat. As heretofore constructed, the refractory blocks constituting the walls of the furnace chamber cut away very rapidly under the action of the heat and hot glass, necessitating frequent renewal at a large expense, and with considerable loss of time in the operation of the furnace.

My invention provides a construction in which the refractory blocks of the side and end walls of the furnace chamber are set back, or offset, sufficiently away from the zone of greatest heat to prevent their rapid destruction, and thereby greatly prolonging their life.

The nature of my invention will be best understood by reference to the accompanying drawings, in which I have shown the preferred embodiment thereof, and which will now be described, it being premised, however, that various changes can be made in the details of construction and arrangement of the parts by those skilled in the art without departing from the spirit and scope of my invention as defined in the appended claims.

In these drawings, the numeral 2 designates the metal frame of the furnace; 3 the furnace chamber; 4 the side walls thereof; 5 one end wall; and 6 the bottom wall, the side, end and bottom walls being constructed of refractory bricks or blocks of the usual character.

7 designates the arch of the furnace. In accordance with my invention, this arch extends over the central portion only of the furnace, the side walls being offset some distance laterally beyond the edges of the arch, as shown in Fig. 2, and the end walls 3 being offset beyond the ends of the arch, as best shown in Fig. 1. It, therefore, becomes necessary to provide means for suspending the arch, which may be hung from the framework in various ways. In the drawings I have shown it as supported by means of the skew-backs 8, which are in turn supported by hangers 9 depending from the horizontal arms 10 of the vertical beams or posts 11 of the furnace frame. I do not, however, limit myself to any particular means for suspending the arch, as this can be accomplished in various ways.

12 designates a series of heating ports, which communicate with the uptakes 13 leading from the regenerators 14. These ports communicate with the furnace underneath the arch, and are carried in from the uptakes 13 above the offset lateral and end portions of the furnace, which are of less height than the arch. These offset portions of the furnace are closed at the top by means of a plurality of cover or shield members 15, one of which is shown in detail in Fig. 4. These cover members are of refractory material, and are arranged side by side, with the vertically extending portions 15$^a$ at their inner ends, which project upwardly within the arch. They are loosely supported at their outer ends on the side and end walls of the furnace, and are arranged to be supported a short distance above the glass level (indicated by the line $a$—$a$ in Fig. 2), being movable vertically so that they may be kept at a substantially fixed distance above the glass level. Various means may be provided for effecting the vertical movement of these members. In the drawings, I have shown them as suspended by rack bars 16, the rack teeth of said bars meshing with gear wheels 17 on shafts 18, which may be actuated by any suitable means (not shown) to effect the simultaneous raising and lowering of the members. These members act to largely retain the heat at the central or arch portion of the furnace and prevent it from passing backwardly into the offset end and side portions of the furnace.

In Figs. 5 and 6 I have shown the preferable arrangement of the end of the furnace opposite the heating end, and whereby glass may be drawn directly from the glass in this offset end portion. The partial end wall 19 at the offset is suspended, as indicated at 20, from a suitable overhead supporting frame 21. The fixed portions 22 of the offset end are also preferably suspended as indicated at 23 from a suitable supporting frame 24. This top portion is shown as provided with three drawing stations A, B, and C, each station being further shown as having six drawing openings 25. Each of these openings has a refractory surrounding ring 26, and a removable cover 27. 28 (Fig. 5) illustrates an open end cylinder, which can be inserted through any one of the drawing openings, and through which the article is drawn.

Placed between the drawing openings, as more clearly shown in Fig. 7, are a plurality of floats 29 of refractory material. The walls of the furnace are provided with suitable vertical guides 30 to receive the ends of these floats and guide them in their floating movements. As clearly shown in Fig. 7, these floats separate the portions of glass between the different drawing openings and prevent any partially melted glass at one drawing opening from floating into an adjacent drawing opening. For the purpose of enabling the removal of such glass, or any other floating scum, I provide a series of skimmers 31 which are slidingly supported upon the upper edges of the refractory floats 29, as also shown in Fig. 7. The end walls of the furnace are preferably provided with openings, normally closed by removable refractory blocks 32, through which a suitable implement may be inserted for engagement with holes 33 in these skimmers, whereby they may be actuated to push the chilled glass or other scum to the center or body portion of the furnace.

Many attempts have been made heretofore to successfully draw glass articles directly from a mass of glass contained in the melting furnace; but great difficulty has been experienced in doing this satisfactorily. One of the greatest objections has been the maintenance of the proper temperature of that portion of the glass from which the drawing is made. A further difficulty has consisted in the fact that after each article has been drawn, the drawn article is severed from the glass in the furnace and a considerable portion of the lower portion of the article remains in the furnace. In order to obtain a satisfactory subsequent draw, this remaining glass must be thoroughly melted down and incorporated into the body of glass in the furnace. This requires considerable time. It is for this purpose that I have provided each of the drawing stations with a considerable number of drawing openings, so that in practice the draw can be made successively from the several openings at each station, thus giving ample time for the residue of glass from any previous draw to become thoroughly melted down. The refractory floats 29, as above stated, effectively prevent this glass left in one drawing opening from floating underneath an adjacent drawing opening; while the skimmers 31 provide means for skimming any glass which may remain unmelted, as well as any other refuse, when necessary.

In the modification shown in Fig. 8, I have shown this offset drawing end portion of the furnace as provided with a port 34 leading into a vertical flue 35 in the end wall of the offset, and which in turn communicates with a stack flue 36. The purpose of the flues 34 and 35 is to draw some of the heat from the body of the furnace over the mass of glass in the drawing end portion, and thereby maintain the proper temperature.

It has been found in the operation of glass furnaces as usually constructed, that while the side and end walls cut away very rapidly, the bottom wall, which is removed a considerable distance from the heating zone, cuts away very slowly and is of relatively long life. By my invention I provide means whereby the side and end walls are offset from the heating zone to a distance which may be equal to or even greater than the distance which separates the bottom wall from the heating zone. In this manner the refractory blocks of the side and end walls are so far removed from the heating zone as to greatly prolong their life. In fact, they can be removed, if desired, to a considerably greater extent than that indicated in the drawings.

I do not limit myself to the details of construction and arrangement of the parts which I have shown and described, since I believe that it is broadly new to provide a glass furnace having a suspended arch over the central portion of the furnace and having its side and end walls offset from the arch portion of the furnace.

What I claim is:—

1. A glass furnace having refractory side and end walls, and a roof arch suspended over the central portion of the furnace, the edges of said roof arch terminating at a distance inside the side and end walls, the furnace having regenerators at its sides with uptakes leading from the regenerators above the side walls of the furnace, and there being ports leading from the uptakes into the furnace underneath said arch, sectional covers closing in the top of the furnace between the side and end walls and the central roof arch, and means for moving the cover sections vertically to fix their position with respect to the glass level of the furnace, substantially as described.

2. A glass furnace having refractory side and end walls, and a roof arch suspended over the central portion of the furnace, the edges of said roof arch terminating at a distance inside the side and end walls, the furnace having regenerators at its sides with uptakes leading from the regenerators above the side walls of the furnace, and there being ports leading from the uptakes into the furnace underneath said arch, sectional covers closing in the top of the furnace between the side and end walls and the central roof arch, and means for simultaneously raising and lowering a plurality of the cover sections, substantially as described.

3. A glass furnace having refractory side and end walls, and a roof arch suspended over the central portion of the furnace, the edges of said arch terminating at a distance from the end and side walls of the furnace, means for introducing the heating medium into the furnace underneath the roof arch only, means for closing in the top of the furnace around said arch at both sides and at one end, the other end forming a drawing extension of the full depth of the glass chamber of the furnace, and said extension having a plurality of drawing openings at the top, together with refractory floats placed between different drawing openings, substantially as described.

4. A glass furnace having refractory side and end walls, and a roof arch suspended over the central portion of the furnace, the edges of said roof arch terminating at a distance inside the side and end walls, means for introducing a heating medium into the furnace below the said arch, sectional covers closing in the top of the furnace at the edges of the arch, and means for adjustably supporting said covers above the glass level of the furnace, substantially as described.

5. A glass furnace having an arch suspended over its central portion, and having its lateral and side walls offset from the arch, heating flues leading into the furnace chamber underneath the arch, and cover members or shields for preventing heat from passing backwardly from the edge portion of the furnace into the offset portions thereof, together with means for raising and lowering said members; substantially as described.

6. A glass furnace having a drawing extension at one end thereof, provided with a plurality of drawing openings arranged in rows, a plurality of floating partitions separating adjacent drawing openings, and cylinders adapted for insertion through said drawing openings and down and partially between the said partitions; substantially as described.

7. A glass furnace having a drawing extension at one end, said extension being provided with a plurality of drawing openings, floating partitions separating adjacent rows of said openings, and skimmers slidingly supported upon said partitions, together with means whereby the skimmers may be slidingly reciprocated on the partitions; substantially as described.

8. A glass melting furnace having a drawing extension at one end, and a plurality of substantially parallel floats in said extension and extending longitudinally thereof, and the extension having a plurality of draw openings intermediate each adjacent pair of floats, substantially as described.

In testimony whereof, I have hereunto set my hand.

THOS. W. CONNINGTON.

Witnesses:
G. M. VIERS,
H. M. CONNER.